United States Patent
Langberg et al.

(10) Patent No.: US 7,636,235 B2
(45) Date of Patent: Dec. 22, 2009

(54) COMPACT PORTABLE MEDIA REPRODUCTION SYSTEM

(75) Inventors: Eric Aaron Langberg, Milford, PA (US); Richard Messerle, Port Jervis, NY (US)

(73) Assignee: Plantronics, Inc., Santa Cruz, CA (US)

( * ) Notice: Subject to any disclaimer, the term of this patent is extended or adjusted under 35 U.S.C. 154(b) by 126 days.

(21) Appl. No.: 11/761,276

(22) Filed: Jun. 11, 2007

(65) Prior Publication Data

US 2007/0288678 A1   Dec. 13, 2007

Related U.S. Application Data

(62) Division of application No. 11/116,173, filed on Apr. 15, 2005, now Pat. No. 7,230,822.

(51) Int. Cl.
*G06F 1/16* (2006.01)
(52) U.S. Cl. .................. 361/679.23; 248/917; 400/691; 439/928.1
(58) Field of Classification Search ......... 248/917–921; 348/837; 400/88, 691, 692; 361/691, 695, 361/801, 679–687, 724–727; 439/928.1
See application file for complete search history.

(56) References Cited

U.S. PATENT DOCUMENTS 6,778,385 B2    8/2004   Forlenza et al.
7,230,822 B2 *  6/2007   Langberg et al. ............ 361/683
2005/0047104 A1  3/2005  Grunow et al.
2005/0088620 A1  4/2005  Dwyer et al.
2006/0109388 A1  5/2006  Sanders et al.

* cited by examiner

*Primary Examiner*—Hung V Duong
(74) *Attorney, Agent, or Firm*—Greenberg Traurig, LLP (57) ABSTRACT

A portable media reproduction system preferably includes a housing with an attached docking component for receiving a portable media player, the docking component being recessed into the housing when in a closed position such that the first side forms a uniformly substantially flat surface. A latch is provided for holding the docking component in the closed position, and a connector connects to the portable media player. The connector is positioned on the docking component to receive the portable media player when the docking component is in an open position. A base component is recessed into the second side of the housing when in a closed position such that the second side of the housing forms a uniformly substantially flat surface. The base component is extendable into an open position such that the it supports the portable media reproduction system in a substantially upright position. Both the base component and the docking component are preferably spring loaded such that actuating the latch releases the docking component and the base component from their respective closed positions, allowing them to spring into their respective open positions.

19 Claims, 9 Drawing Sheets

COMPACT PORTABLE MEDIA REPRODUCTION SYSTEM

This application is a divisional of U.S. patent application Ser. No. 11/116,173 filed Apr. 15, 2005 now U.S. Pat. No. 7,230,822, the entire disclosure of which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to the field of portable media playback equipment, and in particular to portable devices for reproducing audio signals.

BACKGROUND OF THE INVENTION

The past several decades have seen remarkable advances in audio and video reproduction equipment, particularly equipment that allows a variety of audio tracks to be carried or transported with a user from one location to another. Such equipment includes, e.g., equipment for digitally recording, editing, mixing, producing, storing and reproducing audio tracks. Digital files are advantageous for several reasons, including the fact that running error correction algorithms on the files can guarantee that the audio track data in the files is properly stored, which means that the audio can be faithfully reproduced even where an underlying recording medium induces errors or where errors are induced in the copy process. Another advantage of digital files is that reproduction equipment can precisely control the speed at which the audio track is played, thereby effectively guaranteeing consistent playback.

In recent years, new algorithms for storing audio tracks have emerged. One of the more popular of these new audio track storage algorithms is the Motion Picture Entertainment Group level 3 algorithm, commonly referred to as the "MP3" algorithm. The MP3 algorithm uses a variety of techniques, including allowing users to vary the audio track sampling rate as the audio track is recorded, varying the number of bits used to represent a given frequency range, and the like, to generate digital audio track files that are significantly smaller than those used on CD's. This means that users can carry more audio data files on a given medium than they could in the past. For example, a typical seventy-two minute audio CD holds approximately 650 MB of data. Depending on the compression methods chosen, a 650 MB CD-ROM has sufficient capacity for several hours of compressed music.

As digital storage capacity continues to increase and compression algorithms continue to advance, users are able to carry more and more of the music they like with them. This has resulted in the incorporation of audio track reproduction capabilities in an ever-increasing array of audio-capable devices, including, but not limited to, digital cameras, portable digital assistants ("PDA's"), wireless telephones, and the like. Several other devices, generally referred to as portable media players ("PMP's"), have been introduced into the market that are predominately used for reproduction of compressed audio tracks. One of the most popular PMP's is the iPod, sold by Apple Computer, Inc. of Cupertino, Calif. The iPod has become popular because it has a relatively small form factor but can store many gigabytes of audio files and other information on a hard disk drive stored within the PMP. Other PMPs additionally store video information for playback on a small display integrated into the device.

Most of the currently available audio devices are designed to be highly portable and to allow an individual to carry a relatively large number of audio tracks. However, because design of these devices has centered on portability, manufacturers tend to limit them so as to present the reproduced audio to a user only through monaural or stereo headphones that are plugged into the audio device. This means that, at best, these audio devices can only be used to reproduce audio tracks for a limited number of users, such as where one or more splitters are used to allow multiple users to plug headphones into the device. However, because the audio devices are typically battery powered, they are not capable of generating enough energy to power several pairs of headphones. Furthermore, increasing the number of users connected to a single device beyond one or two limits the device's portability.

One method alternatively employed by some in the prior art is to allow users to attach speakers to a portable media player. This allows multiple users to experience audio tracks at the same time. Because the power output of audio devices is typically relatively low, it is frequently advantageous for the speakers to include an amplifier which is powered by an external power source. Some in the prior art have created relatively small, battery powered or alternating current (AC) powered speakers for use with portable audio reproduction equipment. These speakers tend to take a lot of physical abuse during transportation, and frequently the cables and adaptors used to connect the speakers to the audio device are not capable of withstanding such abuse.

One solution offered on the market is the original inMotion™, available from Altec Lansing Technologies, Inc., of Milford, Pa., and described in U.S. patent application Ser. No. 10/836,113 filed Apr. 30, 2004. The inMotion™ was a groundbreaking product which, for the first time, provided powered speakers integrated with a docking station for a portable media player in a relatively lightweight and compact portable package that folded to protect the speaker drivers during transport. While the inMotion™ offered great advantages in terms of robustness, weight, portability, size, and ease-of-use, room for improvement in each of these qualities remains.

SUMMARY OF THE INVENTION

The present invention is directed to a portable media reproduction system that substantially obviates one or more of the limitations of the related art. The invention is a portable media reproduction system preferably having at least two powered speakers housed in a protective case, and including a spring-loaded docking component and a spring-loaded base component which recess into the housing when not in use. The base component is preferably designed to facilitate positioning the speakers at a desired angle to enhance enjoyment of reproduced audio tracks. The audio amplifier can be powered by batteries or an AC power source, although it should be apparent to one skilled in the art that purely battery powered and purely AC powered speaker amplifiers can be substituted therefor without departing from the spirit or the scope of the invention.

The portable media reproduction system of the present invention is preferably designed to be communicatively coupled with one or more portable devices. In one embodiment, the present invention preferably includes an adaptor by which the portable media reproduction system can be connected to one or more PMP's. By way of example, without intending to limit the present invention, the portable media reproduction system may include a docking cradle for attaching an iPod or other portable media player to the portable media reproduction system, thereby allowing the portable audio reproduction system to reproduce audio signals from the portable player. In an alternative embodiment, the docking cradle provided by the present invention may support multiple, interchangeable connection means, thus allowing a plurality of PMP's, satellite radio receivers, digital radio receivers, standard radio receivers, CD players, or other audio or audio/video devices to be communicatively coupled with the portable media reproduction system. The signal received by the system from the media device may be either digital or analog, and the player may be detachable from the system or permanently connected.

In addition to communicatively coupling through a docking port or the like, a preferred embodiment of the present invention also allows external devices, such as, but not limited to, audio signals from a computer, secondary audio device, or the like, to be communicatively coupled to the portable media reproduction system through a standard audio connector. Electronic mixing circuitry preferably allows audio signals from the external device to be input to, and reproduced by, the portable media reproduction system in conjunction with an audio signal from an attached PMP or other device.

In one embodiment, the portable media reproduction system comprises a housing having a first side and a second side; the first side having a docking component for receiving a portable media player and a latch proximate to the docking component, wherein the docking component is held in a closed position by the latch; a connector for connecting a portable media player, the connector positioned on the docking component to receive the portable media player when the docking component is in an open position; the second side having a base component that supports the portable media reproduction system in a desired, substantially upright position when the base component is in the open position, wherein the base component is held in a closed position by the latch; wherein actuating the latch releases the docking component and the base component from the closed position to the open position. The first side is at an angle of approximately 105 degrees from a supporting surface when the portable media reproduction system is in the open position. The portable media player is an iPod, other PMP, cellular phone, satellite radio receiver, digital radio receiver, standard radio receiver, CD player, digital camera, or portable digital assistant. At least one driver is positioned on the first side of the housing. The docking component communicatively couples the personal media player with a personal computer. An auxiliary input is positioned on the portable media reproduction system for reproducing sound from an auxiliary source.

In another embodiment, a portable media reproduction system for reproducing sound from a portable media player through at least one speaker comprises a substantially flat front surface and rear surface; the front surface housing the at least one speaker aimed at a user; a docking component hinged to the portable media reproduction system and having a top side and a bottom side, the bottom side substantially aligned with the front surface when the docking component is in a first position; a connector on the top side for receiving the portable media player when the docking component is in a second position, the second position being approximately perpendicular to the first position; a base component hinged to the portable media reproduction system and having a top side and a bottom side, the bottom side substantially aligned with the rear surface when the base component is in the first position, and the top side being approximately perpendicular to the rear surface in the second position, wherein the bottom side abuts a surface and supports the portable media reproduction system in the second position; and a latch having a docking component flange and a base component flange, the docking component flange engaging the docking component in the first position and the base component flange engaging the base component in the first position, wherein depressing the latch releases the docking component from the docking component flange and the base component from the base component flange, allowing the docking component and the base component to rotate into the second position. The front surface is at an angle of approximately 105 degrees from a supporting surface when the portable media reproduction system is in the second position. The portable media player is an iPod, cellular phone, satellite radio receiver, digital radio receiver, standard radio receiver, CD player, digital camera, or portable digital assistant. The docking component communicatively couples the portable media player with a personal computer. The portable media reproduction system further comprises an auxiliary input for reproducing sound from an auxiliary source.

In yet another embodiment, a method for utilizing a portable media device with portable media reproduction system having at least one speaker, the method comprises the steps of actuating a latch; releasing a docking component and a base component from engagement with the latch; receiving the portable media device on the docking component; and supporting the portable media reproduction system with the base component. The base component supports the portable media reproduction system at an angle of approximately 105 degrees from a bottom surface of the base component. The portable media device is an iPod, cellular phone, satellite radio receiver, digital radio receiver, audio/video player, standard radio receiver, CD player, digital camera, or portable digital assistant. The portable media device is communicatively coupled with a personal computer through the docking component. The portable media reproduction system further comprises an auxiliary input for reproducing sound from an auxiliary source.

It is to be understood that both the foregoing general description and the following detailed description are exemplary and explanatory and are intended to provide further explanation of the invention as claimed. Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings.

DETAILED DESCRIPTION OF THE PREFERRED EMBODIMENT

Reference will now be made in detail to the preferred embodiments of the present invention, examples of which are illustrated in the accompanying drawings. For clarity, corresponding features are consistently labeled across the various views of the invention provided in the figures.

Figure 1:
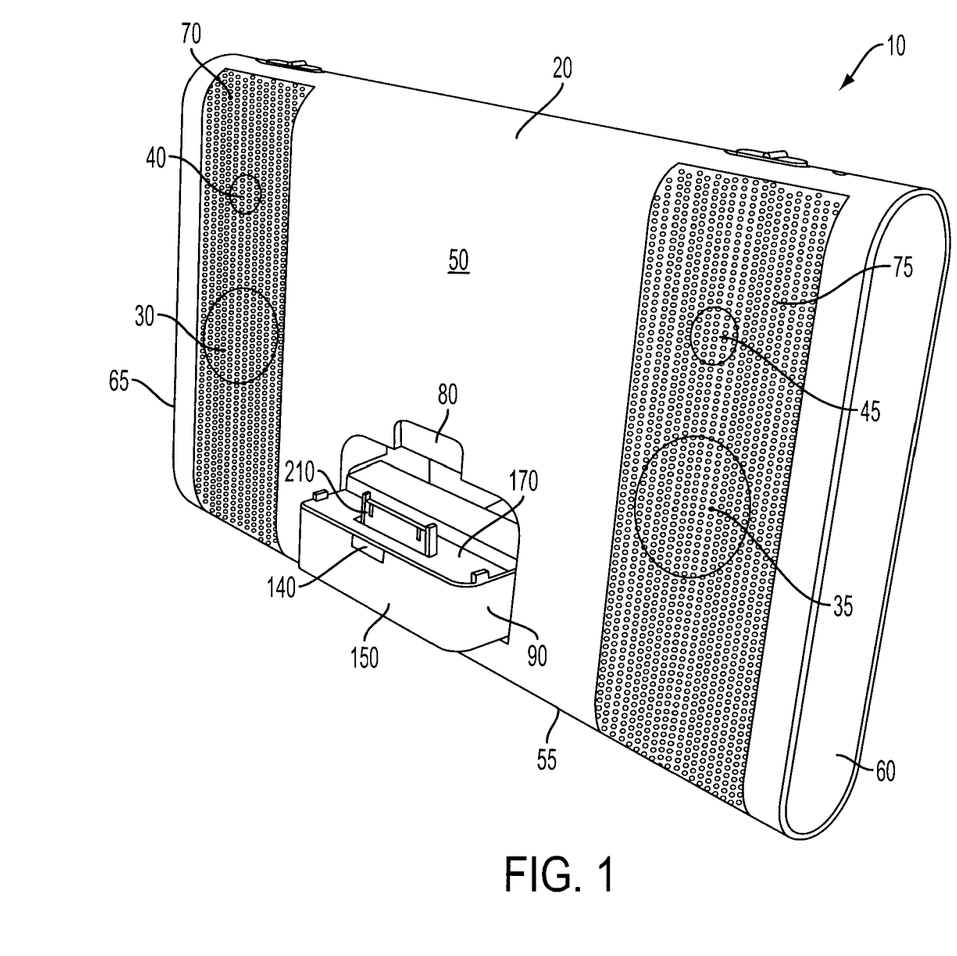
FIG. 1 is a front perspective view of a portable media reproduction system in an open position according to an embodiment of the present invention.
Figure 2:
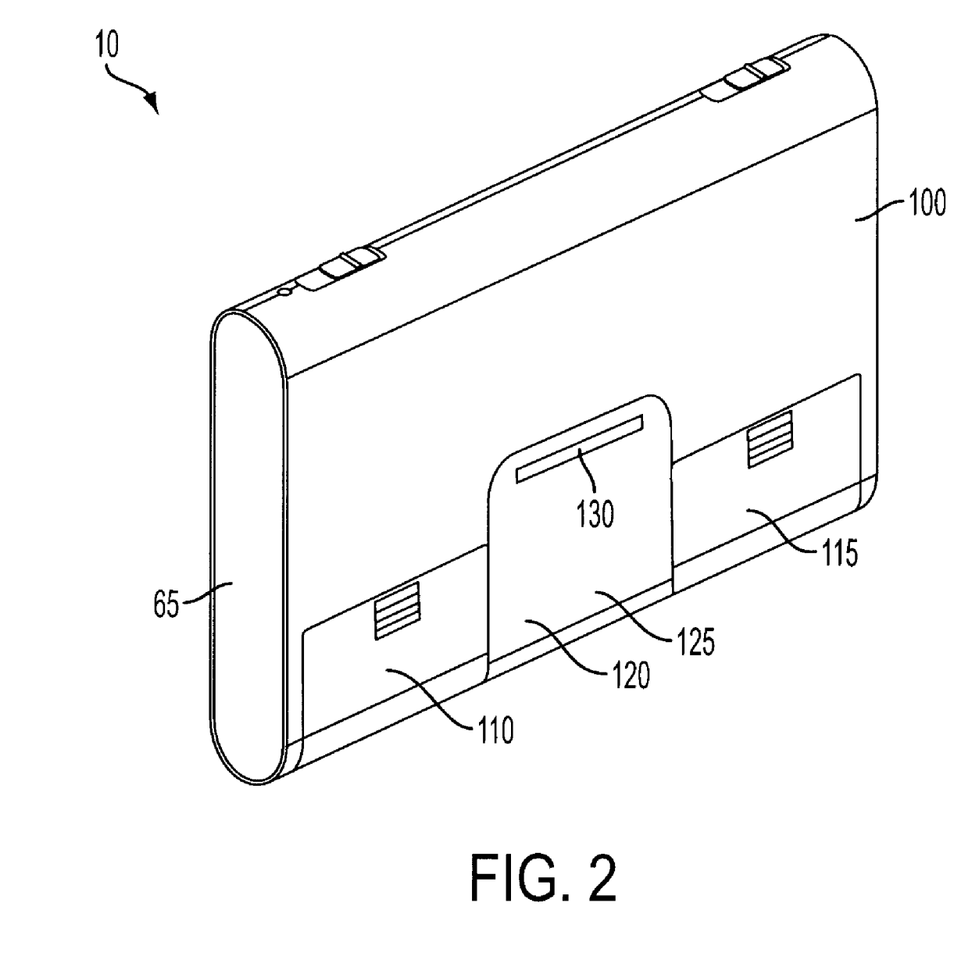
FIG. 2 is a rear perspective view of the portable media reproduction system in the closed position according to an embodiment of the present invention.
Figure 3:
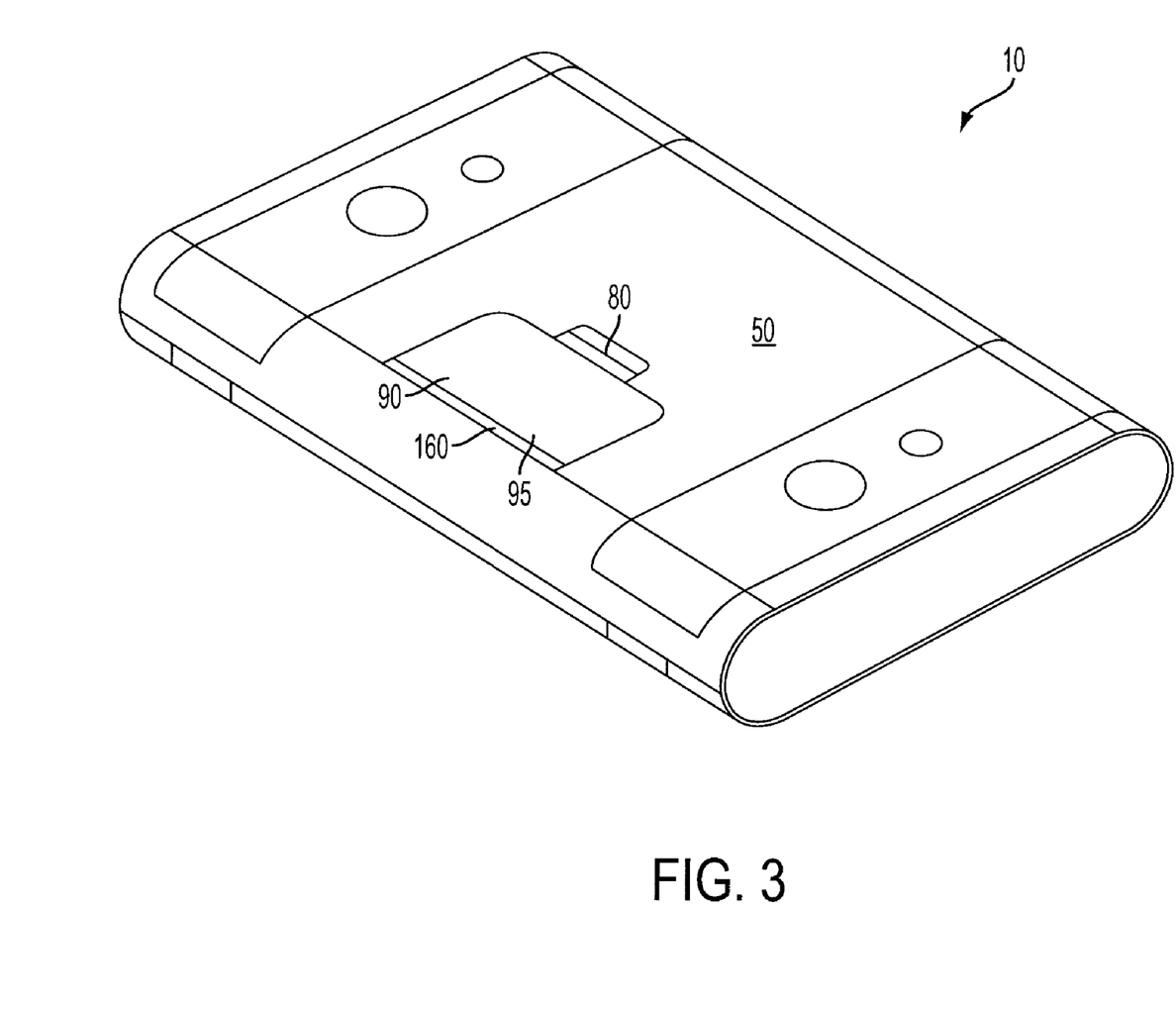
FIG. 3 is a perspective view of the portable media reproduction system in a closed position according to an embodiment of the present invention.

FIGS. 1 to 7 illustrate various views of a portable media reproduction system 10 according to a preferred embodiment of the present invention. Referring to FIG. 1, portable media reproduction system 10 has a casing 20 having a front surface 50, bottom surface 55, right side 60, left side 65, and back surface 100 (FIG. 3). In the preferred embodiment, the front surface 50 has a left speaker array 70 and a right speaker array 75. Left and right speaker arrays 70, 75 each have a 25 mm full-range neodymium micro driver 30, 35 and a 18 mm neodymium tweeter 40, 45. However, one of ordinary skill in the art would appreciate that the casing 20 can house a variety of different speaker configurations. Left and right speaker arrays 70, 75 are optionally covered with a perforated guard or screen to protect drivers 30, 35 and tweeters 40, 45.

A latch 80 and docking component 90 are substantially centered about the front surface 50 of casing 20. In a closed position as shown in FIG. 3, only a bottom side 95 of docking component 90 is exposed. The exposed surfaces of latch 80 and bottom side 95 form a substantially planar surface with front surface 50 in the closed position.

Referring to FIG. 2, a rear view of the portable media reproduction system 10 is shown. Similar to front surface 50, a rear surface 100 is substantially planar. When in the closed position, rear surface 100 only exposes a bottom surface 125 of a base component 120. Base component 120 has a pad 130 and portable media reproduction system 10 has pads 300, 305 for frictionally engaging a surface when base component 120 is in an open position.

Figure 8A:
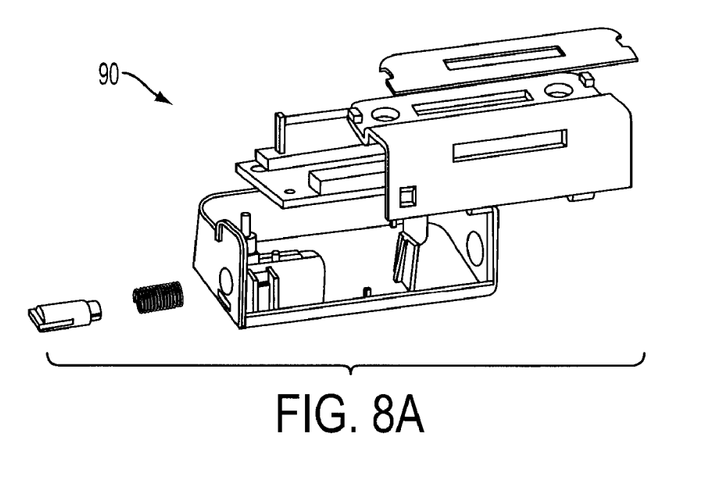
FIGS. 8a and 8b are perspective views showing details of the spring-loaded docking component and spring-loaded base component, respectively.
Figure 8B:
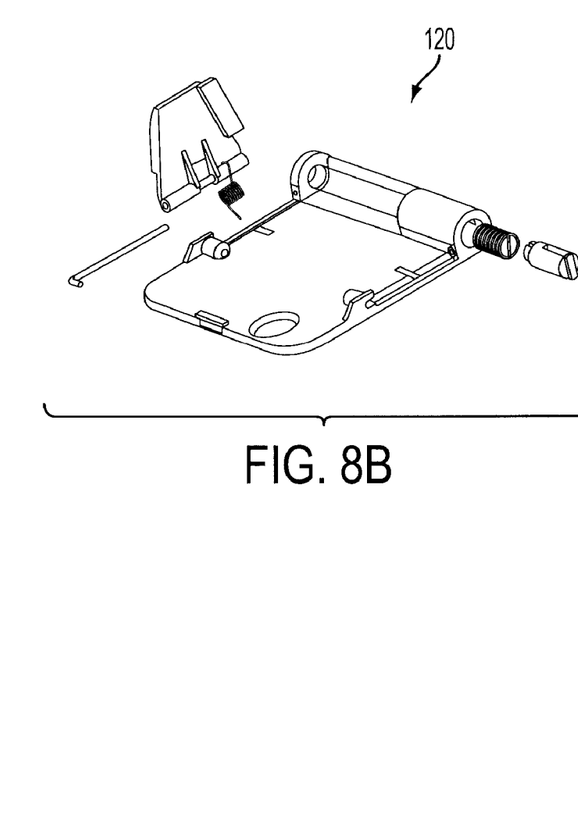

Latch 80 holds docking component 90 and base component 120 in the closed position by friction. By depressing the latch 80 in a direction towards docking component 90, docking component 90 and base component 120 are released from latch 80. A spring mechanism allows docking component 90 and base component 120 to articulate into an open position. FIGS. 8a and 8b show details of the spring-loaded docking component 90 and spring-loaded base component 120, respectively.

Referring to FIGS. 1, 3, 5a, and 5b, a user activates latch 80 in order to release docking component 90 and base component 20. A flange 140 extending from a front surface 150 of docking component 90 is frictionally engaged with a securing flange of latch 80. Upon actuating latch 80, the securing flange is depressed into the casing 20 so that the securing flange and the flange 140 are no longer in contact. The docking component 90 rotates about a hinge 160 until a top surface 170 of docking component 90 is approximately perpendicular to the front surface 50 of the portable media reproduction system 10. A stop flange (not shown) extending from docking component 90 into casing 20 prevents the movement of docking component 90 past the perpendicular position. The docking component 90 is in the "open" position when it has completed rotation to this position.

Figure 4:
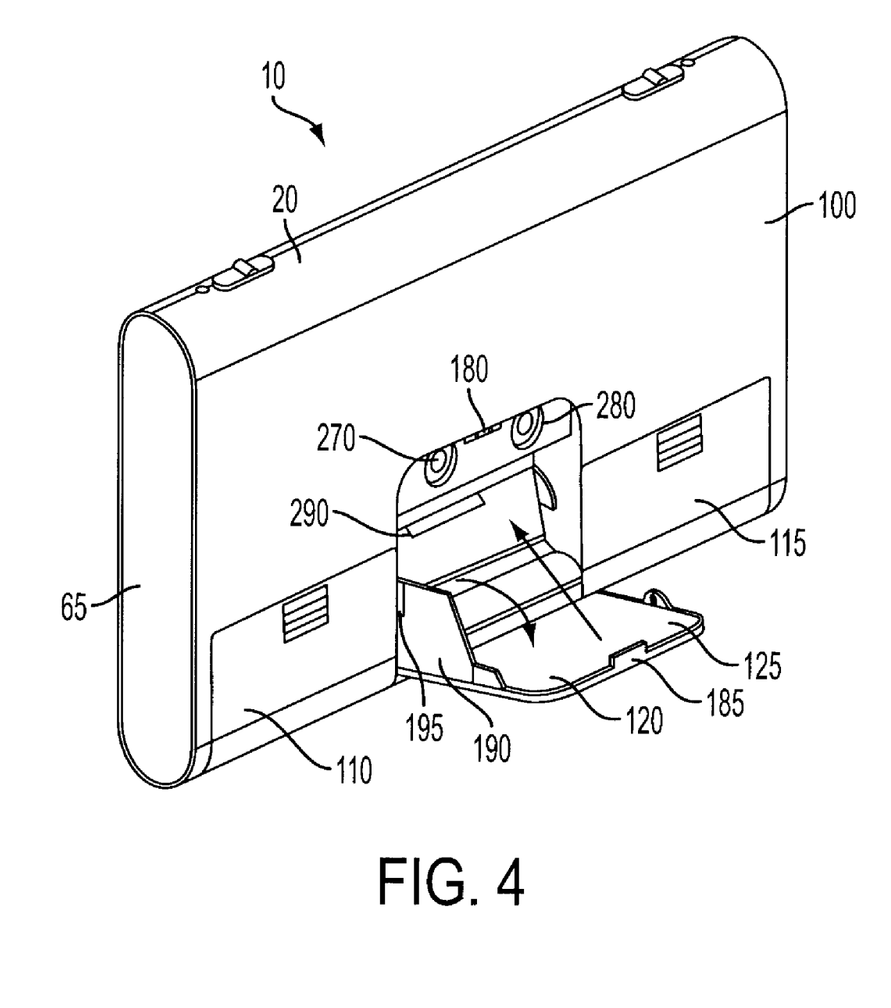
FIG. 4 is a perspective view of the portable media reproduction system in the open position according to an embodiment of the present invention.
Figure 5A:
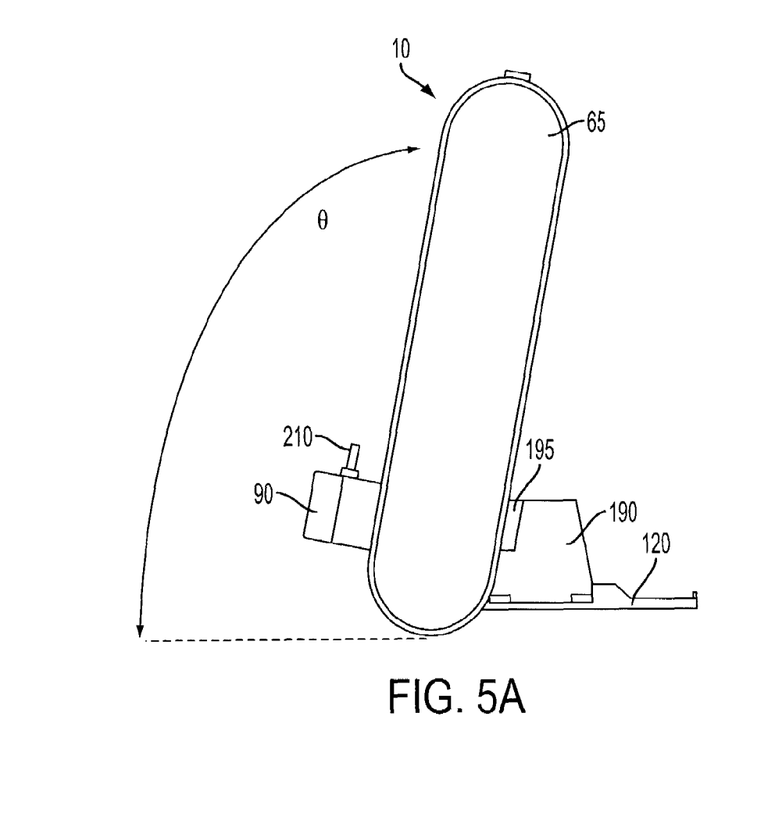
FIGS. 5a and 5b are side views of the portable media reproduction system according to an embodiment of the present invention.
Figure 5B:
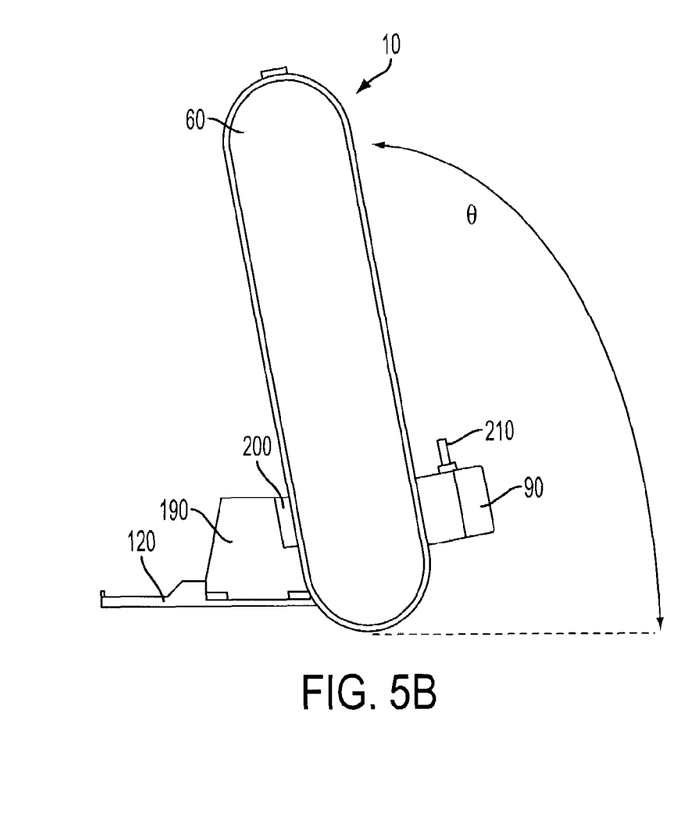
Figure 6A:
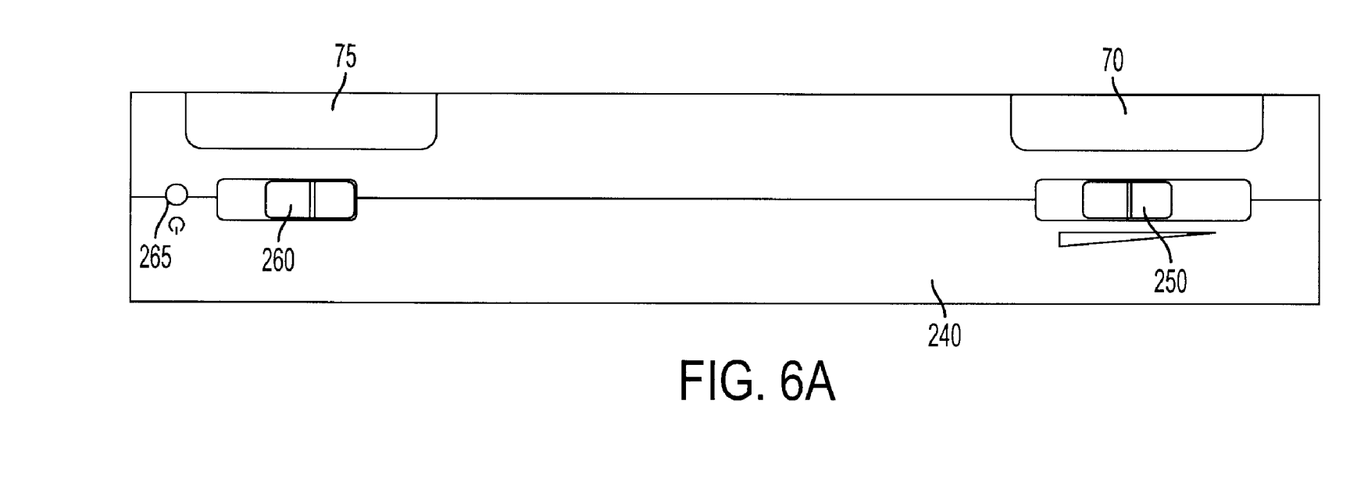
FIGS. 6a and 6b are side views of the portable media reproduction system according to an embodiment of the present invention.
Figure 6B:
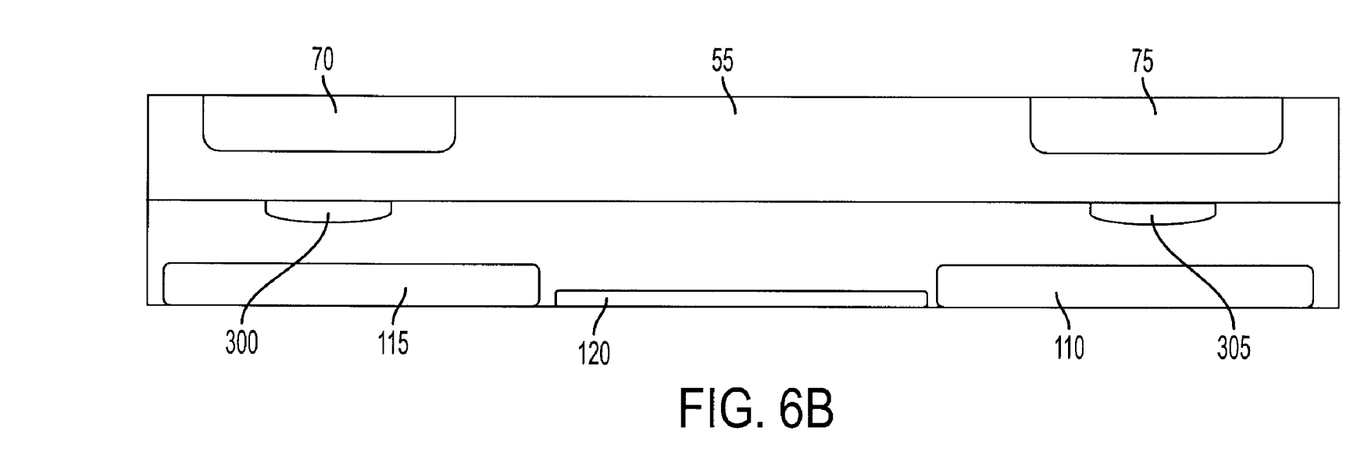

Referring to FIG. 4, on the rear surface 100 of the portable media reproduction system 10, base component 120 remains in a closed position when frictionally engaged with latch 80. A base securing component 180 extends from the casing 20 a recess 185 in base component 120. Upon actuating the latch 80, the base securing component 180 retracts into the casing 20 and no longer engages base component 120, allowing base component 120 to rotate into an open position. In the open position, a top surface 125 of the base component 120 is approximately perpendicular to the rear surface 100. A support flange 190 is hinged to base component 120 and is concealed in casing 20 in the closed position. When the base component 120 rotates from casing 20 into the open position, a spring (not shown) located at the hinge of support flange 90 causes the support flange 90 to rotate into an upright position that is substantially perpendicular to both the rear surface 100 of casing 20 and top surface 125 of base component 120. Support flange 190 has a flange 195 that extends to abut the rear surface 100 when in the open position. Flange 195 is positioned on an angle such that casing 20 abuts at an angle θ of approximately 105 degrees from a surface upon which the portable media reproduction system 10 rests. Alternatively, angle θ may be at any desired angle for delivering sound to an intended listener, but is preferably between about 90 degrees and 115 degrees. A stopping flange 200 abuts an interior side of casing 20 to prevent the support flange from rotating beyond the desired substantially perpendicular position. In such a configuration, the speakers 30, 35, 40, 45 are positioned at an angle that best aligns speakers 30, 35, 40, 45 with an anticipated user position when the portable media reproduction system 10 is used on a desk or other surface and positioned within arm's reach of the user. Although an approximately 105 degree rotation is preferred, it should be apparent to one skilled in the art that the support flange 190 and flange 195 positions are variable, and that alternative rotation angles may be substituted therefor without departing from the spirit or the scope of the invention.

Figure 7A:
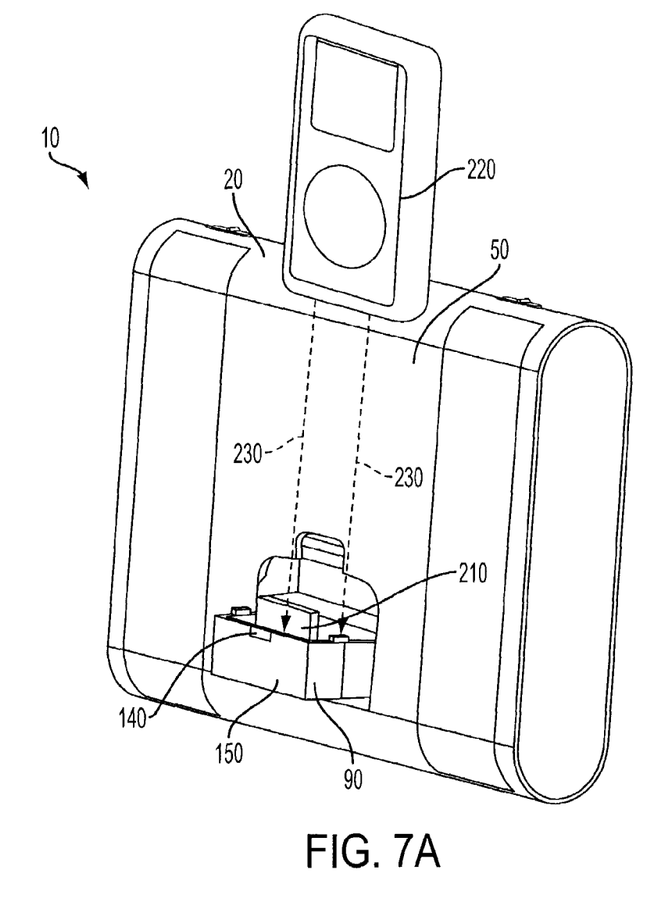
FIGS. 7a and 7b are perspective views of the portable media reproduction system with a portable media device according to an embodiment of the present invention.
Figure 7B:
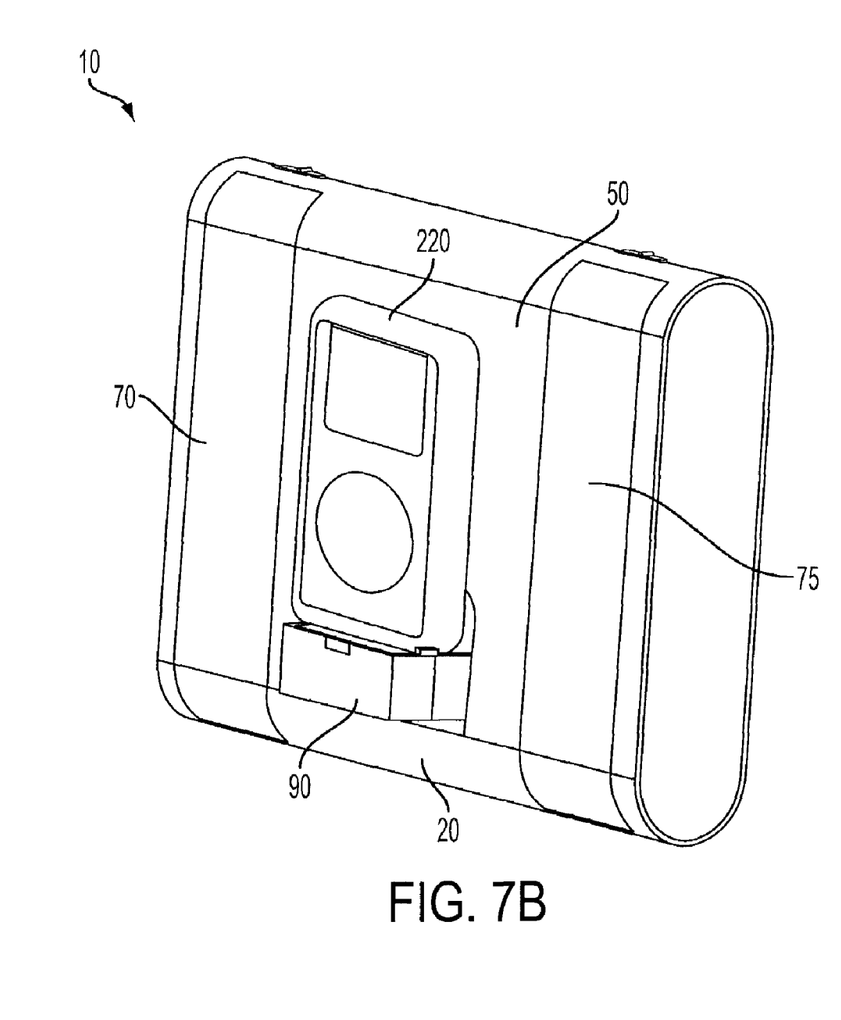

In the open position, a connector 210 on top surface 170 of docking component 90 is exposed and positioned to receive a personal media player ("PMP"), such as an iPod. Alternatively, the portable media reproduction system 10 can be configured to accommodate a cellular phone, satellite radio receiver, digital radio receiver, standard radio receiver, CD player, portable digital assistant, digital camera, or other portable audio or audio/video player. Referring to FIGS. 7a and 7b, an iPod 220 is mounted on connector 210 by sliding iPod 220 in the direction 230. The iPod 220 is dismounted in the opposite direction. When the iPod 220 is mounted on connector 210, the rear of iPod 220 can rest against front surface 50 for added support. In the mounted position, iPod 220 is substantially centered between speakers 30, 35, 40, 45, as shown in FIGS. 7a and 7b.

When the base component is in the open position, a power adapter 270 and an external audio input jack 280 are exposed. Additionally, a synchronizing cable port 290 is positioned on the rear surface of the docking component for synchronizing the iPod 220 with a computer or other similar device.

When media device 220 is communicatively coupled with the portable media reproduction system 10, media device 220 may also receive power from the portable media reproduction system 10. In one embodiment, the portable media reproduction system 10 may only supply power to media device 220 when the portable media reproduction system 10 is receiving power from an external power source, such as, but not limited to, an AC to DC converter, or to an external device capable of providing power to the portable media reproduction system 10. In an alternative embodiment, the portable media reproduction system 10 may supply power to the media device regardless of whether the portable media reproduction system 10 is operating on power from an external power source or from internal batteries. In addition to allowing media device 220 to function, power supplied by the portable audio reproduction system 10 to media device 220 may also allow the media device to charge any rechargeable batteries stored therein.

Power adapter input 270 preferably allows the portable media reproduction system 10 of the present invention to be powered from an external power source, such as, but not limited to, an AC to DC converter or external battery pack. In addition to receiving power from an external power source, the portable media reproduction system 10 can also preferably be powered by one or more batteries, which are preferably stored within the portable media reproduction system 10. In an exemplary embodiment, rear surface 100 has two slidably removable covers 110, 115 for access to battery housings. Although rechargeable batteries, such as, but not limited to, lithium ion batteries, are presently preferred, it should be apparent to one skilled in the art that disposable batteries can be substituted therefor without departing from the spirit or the scope of the invention.

In an embodiment in which rechargeable batteries are used, the rechargeable batteries are preferably recharged any time the portable media reproduction system 10 is connected to an external power source via power adapter. The portable media reproduction system 10 may also charge the batteries, and receive power, if a device is connected thereto via synchronizing cable port. In an embodiment in which rechargeable batteries are used, the batteries should preferably be of a capacity such that, if the portable media reproduction system 10 is disconnected from the external power source when the batteries are fully charged, the portable media reproduction system 10 can be powered and reproduce audio signals for several consecutive hours without needing to be recharged.

Power from a power adapter, an externally connected device, and/or the batteries is preferably used to power a Class D or other audio amplifier housed within the portable media reproduction system, as well as other aspects of the invention. A Class D amplifier is advantageous because of the relatively high efficiencies associated with such amplifiers. Such efficiencies provide reduced power consumption over conventional amplifiers, thereby improving the system's battery life. The amplifier is preferably used to convert the audio signals from media device, preferably received via docking component and/or from an auxiliary audio source connected to the portable media reproduction system 10 through auxiliary input jack, into a signal capable of driving the speakers.

Locating auxiliary input jack 280, synchronizing cable port 290, and power adapter 270 near each other is advantageous because it simplifies connecting the portable media reproduction system 10 to, and disconnecting the portable media reproduction system 10 from, any attached devices. All are hidden in the closed position for protection. However, it should be apparent to one skilled in the art that the physical location of input jack 280, synchronized cable port 290, and power adapter 270 can be varied without departing from the spirit or the scope of the invention.

As illustrated in FIGS. 1 through 6a, the portable media reproduction system 10 is preferably equipped with power switch 260, which allows a user to easily turn the system 10 on and off. A light emitting diode ("LED") 265 is preferably capable of displaying a plurality of colors and thereby conveying information to a user. By way of example, without intending to limit the present invention, LED may be powered off, or dark, when the portable media reproduction system is turned off, may glow green when the portable media reproduction system is connected to an external power source, may glow yellow when the portable media reproduction system is being powered by batteries, and may glow red when the portable media reproduction system is being powered by batteries and the estimated remaining battery power drops below a given threshold.

Although power switch can preferably be used to turn the portable media reproduction system on and off, in an alternative embodiment, the portable media reproduction system may ignore attempts to turn the portable media reproduction system on when the portable media reproduction system is closed. The portable media reproduction system may also automatically power off when closed. These features can help prevent draining the batteries when the portable media reproduction system is not in use.

A user can also set the overall output level, or volume, by adjusting volume control 250, positioned on a top surface 240.

Additional connectors, such as those supporting the Universal Serial Bus, Fire Wire, or other such standards, may also be added to the portable media reproduction system. Such connectors may allow the portable media reproduction system to replace a docking station traditionally associated with portable media devices, thus enabling the portable media device to synchronize files with a computer.

The portable media reproduction system may also be equipped with one or more handles or carrying straps. This can facilitate easily transporting the portable media reproduction system.

Pads 300, 305 provide frictional resistance on a surface when the portable media reproduction system 10 is in the open position on the surface.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A portable media reproduction system comprising:
   a housing having a first side and a second side;
   a docking component on the first side for receiving a media source selected from the group consisting of: phone, satellite radio receiver, digital radio receiver, standard radio receiver, CD player, digital camera, portable digital assistant or audio/video player;
   a latch for holding the docking component in a closed position;
   a connector for connecting to the media source, the connector positioned on the docking component to receive the media source when the docking component is in an open position;

the second side having a base component that supports the portable media reproduction system in an operating position when the base component is in an open position, wherein the base component is held in a closed position by the latch;

wherein actuating the latch releases the docking component and the base component from their respective closed positions their respective open positions.

2. The portable media reproduction system of claim 1, wherein the latch is proximate the docking component.

3. The portable media reproduction system of claim 1, wherein the first side is at an angle of approximately 105 degrees from a supporting surface when the portable media reproduction system is in the open position.

4. The portable media reproduction system of claim 1, further comprising at least one driver on the first side of the housing.

5. The portable media reproduction system of claim 4, further comprising an internal battery power supply.

6. The portable media reproduction system of claim 1, wherein the docking component communicatively couples the media source with a personal computer.

7. The portable media reproduction system of claim 1, further comprising an auxiliary input for reproducing sound from an auxiliary source.

8. A portable media reproduction system for reproducing sound from a media source selected from the group consisting of: phone, satellite radio receiver, digital radio receiver, standard radio receiver, CD player, digital camera, portable digital assistant or audio/video player through at least one speaker, the portable media reproduction system comprising:

a substantially flat front surface and rear surface;

the front surface housing the at least one speaker aimed at a user;

a docking component hinged to the portable media reproduction system and having a top side and a bottom side, the bottom side substantially aligned with the front surface when the docking component is in a first position;

a connector on the top side for receiving the media source when the docking component is in a second position, the second position being approximately perpendicular to the first position;

a base component hinged to the portable media reproduction system and having a top side and a bottom side, the bottom side substantially aligned with the rear surface when the base component is in the first position, and the top side being approximately perpendicular to the rear surface in the second position, wherein the bottom side abuts a surface and supports the portable media reproduction system in the second position; and, a latch having a docking component flange and a base component flange, the docking component flange engaging the docking component in the first position and the base component flange engaging the base component in the first position, wherein depressing the latch releases the docking component from the docking component flange and the base component from the base component flange, allowing the docking component and the base component to rotate into the second position.

9. The portable media reproduction system of claim 8, wherein the front surface is at an angle of approximately 105 degrees from a supporting surface when the portable media reproduction system is in the second position.

10. The portable media reproduction system of claim 8, wherein the docking component communicatively couples the media source with a personal computer.

11. The portable media reproduction system of claim 8, further comprising an auxiliary input for reproducing sound from an auxiliary source.

12. The portable media reproduction system of claim 8, further comprising an internal battery power supply.

13. A method for utilizing a media source with a portable media reproduction system having at least one speaker, the method comprising the steps of:

actuating a latch that is operatively connected to a docking component and a base component, thereby releasing the docking component and the base component and causing the docking component and the base component to extend from a housing;

engaging the media source with the docking component; and, supporting the portable media reproduction system with the base component;

wherein said media source comprises a media source selected from the group consisting of: phone, satellite radio receiver, digital radio receiver, standard radio receiver, CD player, digital camera, portable digital assistant or audio/video player.

14. The method of claim 13, wherein the base component supports the portable media reproduction system at an angle of approximately 105 degrees from a bottom surface of the base component.

15. The method of claim 13, further comprising the step of communicatively coupling the media source with a personal computer through the docking component.

16. The method of claim 13, further comprising the step of providing an auxiliary input for reproducing sound from an auxiliary source.

17. A portable media reproduction system comprising:

a housing having a first side and a second side;

a docking component on the first side for receiving a media source selected from the group consisting of: phone, satellite radio receiver, digital radio receiver, standard radio receiver, CD player, digital camera, portable digital assistant or audio/video player, the docking component being recessed into the housing when in a closed position such that the first side forms a uniformly substantially flat surface;

a latch for holding the docking component in the closed position; and, a connector for connecting to the media source, the connector positioned on the docking component to receive the media source when the docking component is in an open position.

18. The portable media reproduction system according to claim 17, further comprising:

a base component recessed into the second side of the housing when in a closed position such that the second side of the housing forms a uniformly substantially flat surface, the base component being extendable into an open position such that the base component supports the portable media reproduction system in a substantially upright position.

19. The portable media reproduction system according to claim 18, wherein both the base component and the docking component are spring loaded and wherein actuating the latch releases the docking component and the base component from their respective closed positions, allowing them to spring into their respective open positions.

* * * * *